Oct. 8, 1963   H. L. CAMPBELL   3,106,245
DOWN HOLE PLUGGING DEVICE FOR FISHING TOOL
Filed Feb. 10, 1960   2 Sheets-Sheet 1
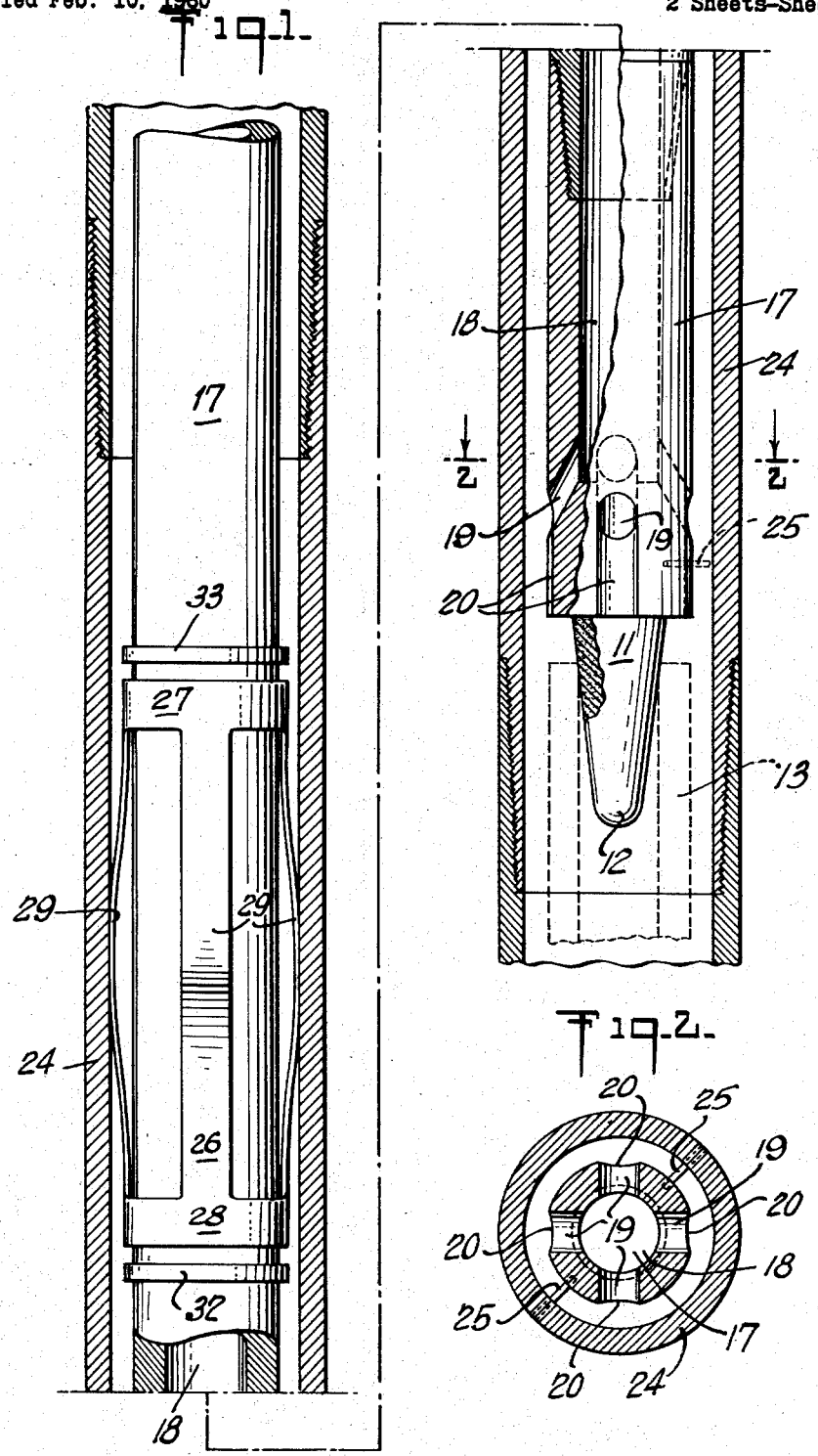

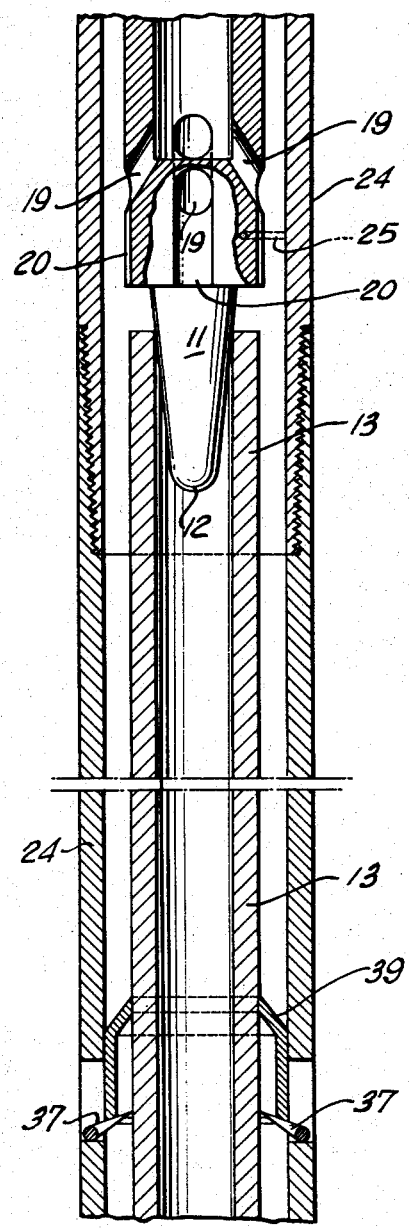

United States Patent Office 3,106,245
Patented Oct. 8, 1963

3,106,245
DOWNHOLE PLUGGING DEVICE FOR FISHING TOOL
Hosea L. Campbell, Houma, La., assignor to Texaco Inc., New York, N.Y., a corporation of Delaware
Filed Feb. 10, 1960, Ser. No. 7,903
12 Claims. (Cl. 166—55.6)

This invention is concerned with a down hole tool for use in fishing operations generally. More specifically the tool according to this invention is applicable to a fishing operation where the fish is open, so that circulation of fluid takes place therethrough.

The invention is applicable wherever a down hole plugging tool may be useful. But, it is particularly designed for use in connection with a situation where a fish is to be operated upon with overshot tools that are hydraulically actuated. This is so because, where the fish is open so that fluid circulates therethrough (e.g. down the center hollow passageway of the fish and up to return via channeling of one sort or another), hydraulically actuated overshot tools will not operate properly, if at all.

Although this tool is applicable wherever the structure thereof may warrant, it is illustrated herein as applied in connection with the operation of a hydraulically actuated outside cutting tool. Thus, such outside cutting tool is connected to a wash pipe that is integrally attached therewith in order to lower the cutting tool over a fish that it is desired to cut. As indicated above, such an outside cutting tool may have difficulty in operating satisfactorily, if at all, in the situation where the fish that is to be cut is open, so that circulation of fluid through the center of the fish with return via channeling, causes a bypass of hydraulic pressure that would be required for operating the cutting tool. By making use of a tool in accordance with this invention, the inability for such an outside cutter to operate satisfactorily, may be overcome by the plugging of the upper (open) end of the fish so that circulation of fluid therethrough is completely stopped. This means that the fluid must circulate downward in the annulus around the fish (inside of the washover pipe).

Consequently, it is an object of this invention to provide a down hole tool for use in fishing operations or the like, where the fish or other element down a hole is to be closed off so as to avoid circulation of fluid therethrough.

Another object of this invention is to provide a down hole tool that is especially adapted for use with a hydraulically actuated outside cutting tool, or the like, such that a fish may be plugged to force circulating fluid to go outside of the fish and thus have the hydraulic effect required for operation of the cutting tool.

Briefly, the invention may be described as a tool for down hole fishing operations wherein the fish permits circulation of fluid therethrough. This tool comprises in combination a plug means for engaging the top of said fish, to cut off the circulation therethrough; and also comprises means for supporting said plug means centrally within said hole during the lowering thereof into said hole onto said fish.

Again briefly, the invention is concerned with deep well fishing operations. It constitutes a down hole tool for use with washover pipe. This down hole tool comprises a conical plug for engaging the top of a fish; and comprises means for detachably supporting said plug within said washover pipe. The tool also comprises means for centralizing said supporting means within said washover pipe. The said supporting means is hollow in order to aid circulation of fluid therethrough.

A specific illustration of a hydraulically actuated outside cutting tool, with which the tool according to this invention may be employed, is had in a copending application, Serial No. 853,024, filed November 16, 1959, in the name of this inventor and assigned to the same assignee.

The foregoing and other objects and benefits of this invention are set forth in further detail in connection with a specific embodiment thereof, that is described in the specification and illustrated in the drawings wherein:

FIG. 1 is a longitudinal cross section, partly in elevation showing the tool as it is applied to the upper end of a fish;

FIG. 2 is a transverse cross section view taken along the lines 2—2 of FIG. 1 and looking in the direction of the arrows; and FIG. 3 is a vertical sectional view corresponding to FIG. 1, but also showing schematically an outside cutting tool in the combination.

Referring to the drawings, it will be observed that the tool consists of a plug means comprising a plug 11 and a supporting body element 17. Plug 11 has a rounded tip 12 and is generally conical in configuration, with sufficient taper to insure the entry of the plug into the opening at the top of a fish, e.g., a fish 13 indicated in dashed lines. The plug 11 is constructed of some relatively soft material, such as lead or rubber etc.; and is preferably solid in order to provide sufficient strength and firmness.

The plug 11 is integrally fastened securely at the lower end of a supporting body 17 that is preferably made up of a desired length, or lengths of drill stem or similar pipe. Therefore, there is a hollow central opening 18 within the body 17 that extends all the way to the top of the body 17, leaving an opening for the entry of circulation fluid. At the bottom of the hollow interior 18 there are four passages 19 that slope downwardly and lead from the bottom of the hollow interior 18 of the tool 17, outward to corresponding grooves 20 (one for each passage 19) that merely help provide a greater free passage for circulating fluid from the outside opening of the passages 19 down to the bottom of the body 17.

The passages 19 are preferably angled downward at 60° from the horizontal. These passages thus act to provide fluid jets that forcefully direct the circulating fluid under pressure outward from the interior space 18 within the tool body 17, to the periphery of the annular space around the fish 13.

The tool elements thus far described, might be operated as is by lowering into a hole for contacting the fish, in any convenient manner (not shown). However, it is preferred to employ this tool in conjunction with wash over pipe, e.g., a wash over pipe 24, illustrated. The body 17 of the tool is detachably fastened centrally within the washover pipe 24, by means of a pair of shear pins 25.

Since the body 17 of the tool is quite elongated in order to provide desired weight thereof, and since the pipe that makes up this body is preferably drill stem or the like, it is advisable to provide a centralizing spring element 26. This element 26 is made up of two solid rings or bands 27 and 28, at the extremities thereof, with a plurality of bowed spring arms 29 extending longitudinally and connecting bands 27 and 28 together. To hold the spring element 26 in place on the body 17 of the tool, there are two band clamps 32 and 33. These band clamps act as stops for preventing the spring element 26 from sliding longitudinally beyond either of the clamps, which are securely fastened to the body 17 of the tool in any convenient manner, e.g., by a shrink fit thereon.

Referring to FIG. 3, the washover pipe 24 carries a plurality of pivoted cutters 37 at a position below plug 11, and a hollow piston member 39 which is adapted to move downwardly under hydraulic pressure into contact with cutters 37 and cam them inwardly into cutting engagement with the fish 13.

Operation

In operation, the tool is employed with an outside cutter or the like that is supported on a washover pipe, such as washover pipe 24 illustrated. The cutting tool and washover pipe may be lowered over the fish 13 until the plug 11 enters the top of the fish and comes to rest securely therein so as to plug the opening at the top of the fish tightly. Then as the washover pipe and cutting tool are further lowered around the fish 13, the washover pipe 24 will continue to move downward and will consequently shear off the shear pins 25 that connect the body 17 of the tool with the washover pipe 24. Thereafter, when the cutting tool is in place at a desired location for making the cut, the pressure on hydraulic circulating fluid within the washover pipe 24 will be increased so as to cause a tendency for circulation of the fluid. Such pressure acts down inside the hollow portion 18 of the body 17 of the tool, as well as in the annulus around the tool, and on down around the fish. It is this hydraulic fluid pressure that acts upon the piston 39 of the outside cutter, to cause it to activate the cutting elements into cutting engagement with the fish. Then the washover pipe and cutters 37 are rotated to cut off a top length of the fish.

In the absence of this tool, when a fish, e.g., fish 13, is open so that it allows the circulation of hydraulic fluid therethrough; the flow of fluid takes place through the center of the fish 13, and consequently insufficient hydraulic pressure is built up in the annulus outside of the fish to actuate an outside hydraulic tool, such as the outside cutter referred to above. Therefore it is the plug, that acts when this tool is employed, to cut off the circulation of fluid through the fish. This forces the fluid to be directed into the annulus outside of the fish where it is required. This action is aided by the passages 19 and grooves 20, which direct the flow of fluid from the hollow 18 within the body 17 of the tool, outward in a jet stream fashion to the periphery of the annulus within the washover pipe 24, and outside of the fish 13.

It will be noted that when a given fish is removed after a cut has been completed; the tool of this invention (which is plugging the top of the fish) will be removed therewith, as they are both raised up along with the washover pipe 24. Such operation is, of course, carried out from the surface.

It will be appreciated, that if desired, the body portion 17 of this tool may take the form of a continuous string of pipe, e.g., drill stem, all the way to the surface so that after the desired plugging action has been completed the tool may be removed prior to the lifting of the fish.

It is pointed out that the body portion 17 of the tool, may take the form of a short length of drill stem or similar pipe. Preferably, such drill stem or pipe is of the same outside diameter as the fish that is being recovered. This is ordinarily easy to accomplish because the fish is most often composed of drill stem that has become stuck in the hole. Therefore a length or two of the same size drill stem may be used in forming body portion 17 of the plugging tool. In addition, the same outside diameter or body 17 of the plugging tool, aids in the diverting of fluid from the hollow interior of the body 17 to the annulus that surrounds the fish.

While a specific embodiment of the invention has been described in considerable detail above in accordance with the applicable statutes, this is not to be taken as in any way limiting the invention but merely as being descriptive thereof.

What is claimed as the invention is:

1. In deep well fishing apparatus, a down hole tool for use with washover pipe comprising a conical relatively soft material plug adapted to fit within a washover pipe for engaging the top of a fish, a supporting body element attached to said plug, means for detachably supporting said body element within said washover pipe, said body element having an elongated hollow configuration for passage of circulation fluid therethrough, means for centralizing said body element within said washover pipe, and a plurality of fluid passages from said hollow interior of said body element to the exterior thereof, said passages being sloped downward for directing circulation fluid downward and around the outside of said fish.

2. A tool for down hole fishing operations wherein the fish permits circulation of fluid therethrough, comprising in combination plug means including a relatively soft material conical shaped plug for engaging the top of said fish to cut off the circulation therethrough, a washover pipe enclosing said plug means for surrounding and extending downward around said fish in annularly spaced relation thereto, shear pin means for supporting said plug means from said washover pipe, means for centralizing said plug means within said washover pipe during the operation of said tool and said tool also including passage means for circulating fluid therethrough and around the outside of said fish.

3. A tool for down hole fishing operations wherein the fish permits circulation of fluid therethrough, comprising in combination plug means including a relatively soft material conical plug for engaging the top of said fish to cut off the circulation therethrough and an elongated hollow body element carrying said plug at the lower extremity thereof, said body element having substantially the same diameter as said fish, means for supporting said plug means including a washover pipe and shear pin means connecting said body element to said washover pipe, and means for centralizing said body element within said washover pipe during the lowering thereof into said hole onto the top of said fish.

4. A tool for down hole fishing operations wherein the fish is a tube having an open top which permits circulation of fluid therethrough, comprising in combination plug means including a relatively soft material conically shaped plug for engaging the top of said fish to cut off the circulation therethrough and an elongated hollow body member having said plug attached thereto at the lower extremity thereof, a washover pipe enclosing said plug means in spaced relation thereto for lowering into said hole and surrounding said fish, shear pin means detachably connecting said body member to said washover pipe, means for centralizing said body member within said washover pipe, and a plurality of passages downwardly sloping from the hollow interior of said body member through the wall thereof for providing free circulation of fluid directed outward and down around the periphery of said fish.

5. A fishing tool for recovering tubing having an open top from a well comprising, in combination, a washover pipe adapted to pass over the outside of said tubing; an hydraulically actuated outside cutting tool carried by said washover pipe for engaging said tubing below the open top thereof for cutting off a length of said tubing; plug means for said open top within said washover pipe above said cutting tool, and spaced from the inside wall of said washover pipe to provide a passage between said plug means and said washover pipe for the flow of hydraulic fluid to actuate said cutting tool; and means detachably connecting said plug means to said washover pipe for supporting said plug means within said washover pipe, the construction and arrangement being such that after said plug means enters said open top, further movement of said washover pipe downwardly over said fish detaches said plug means from said washover pipe.

6. Apparatus in accordance with claim 5 wherein said plug means comprises a tubular body element carrying on the lower end thereof a plug adapted to fit within said open top, said body element having passages extending from the inside to the outside thereof for conducting hydraulic fluid from the interior of said plug means to the space surrounding said plug means, for actuating said cutting tool.

7. In deep well fishing apparatus for fishing operations wherein the fish is a tube having an open top, in combination, a washover pipe; plug means for said open top positioned within said washover pipe and spaced from the inside wall thereof providing an annular passage therebetween for the flow of hydraulic fluid; and support means detachably connecting said plug means to said washover pipe for supporting said plug means therein as said washover pipe is lowered into a well, the construction and arrangement being such that after said plug means engages said open top, further movement of said washover pipe downwardly over said fish detaches said plug means from said washover pipe whereby said plug means remains stationary in contact with said open top.

8. In apparatus in accordance with claim 7, means for centralizing said plug means within said washover pipe after said plug means enters said open top.

9. In apparatus in accordance with claim 7, said plug means comprising a plug and an axially aligned elongated body carrying said plug and extending upwardly therefrom, and said support means being shear pin means connecting said body to said washover pipe.

10. In apparatus in accordance with claim 7, said plug means comprising a plug and an axially aligned elongated hollow body carrying said plug and extending upwardly therefrom, said hollow body having duct means extending from the inside to the outside thereof for directing fluid into said annular passage in said washover pipe to flow down around said fish.

11. In apparatus in accordance with claim 7, said plug means having a generally conical shape to fit readily within the open top of said fish.

12. A fishing tool for recovering tubing having an open top from a well comprising, in combination, a washover pipe adapted to pass over the outside of said tubing; an hydraulically actuated outside cutting tool carried by said washover pipe for engaging said tubing below the open top thereof for cutting off a length of said tubing; plug means for said open top within said washover pipe above said cutting tool, and spaced from the inside wall of said washover pipe to provide a passage between said plug means and said washover pipe for the flow of hydraulic fluid to actuate said cutting tool; and support means detachably connecting said plug means to said washover pipe for supporting said plug means within said washover pipe, the construction and arrangement being such that after said plug means contacts said open top, further movement of said washover pipe downwardly over said fish detaches said plug means from said washover pipe whereby said plug means remains stationary in contact with said open top.

References Cited in the file of this patent

UNITED STATES PATENTS

| | | |
|---|---|---|
| 1,594,303 | Keown et al. | July 27, 1926 |
| 2,647,008 | Stewart et al. | July 28, 1953 |
| 2,832,432 | Hall | Apr. 29, 1958 |
| 2,865,454 | Richards | Dec. 23, 1958 |
| 2,879,849 | Le Bus | Mar. 31, 1959 |
| 2,921,630 | Le Bus | Jan. 19, 1960 |